United States Patent
Hsu

[11] Patent Number: 6,081,059
[45] Date of Patent: Jun. 27, 2000

[54] OUTER-ROTOR ELECTRIC MOTOR HAVING INNER-STATOR FORMED BY CONCENTRICALLY WRAPPING FLATTENED STATOR ELEMENTS ON STATOR CORE

[76] Inventor: Chun-Pu Hsu, 19, Wu-Chien Sixth Road, Wu-Ku Industrial Park, Wu-Ku, Taipei Hsien, Taiwan

[21] Appl. No.: 09/296,691

[22] Filed: Apr. 21, 1999

[51] Int. Cl.[7] .............................. H02K 1/12; H02K 15/02
[52] U.S. Cl. ...................... 310/179; 310/216; 310/218; 310/259; 310/269; 29/596; 29/597; 29/598
[58] Field of Search .................................. 310/254, 259, 310/41, 216, 218, 269, 156, 194; 29/596, 597, 598, 609, 605

[56] References Cited

U.S. PATENT DOCUMENTS

| | | | |
|---|---|---|---|
| 3,577,851 | 5/1971 | Detheridge | 29/596 |
| 3,886,256 | 5/1975 | Ohuchi et al. | 310/216 |
| 4,102,040 | 7/1978 | Rich | 29/598 |
| 4,350,914 | 9/1982 | Searle | 310/194 |
| 4,395,815 | 8/1983 | Stanley et al. | 29/598 |
| 4,712,035 | 12/1987 | Forbes et al. | 310/269 |
| 4,818,911 | 4/1989 | Taguchi et al. | 310/259 |
| 5,642,011 | 6/1997 | Fanning et al. | 310/216 |

*Primary Examiner*—Nestor Ramirez
*Assistant Examiner*—Tran N Nguyen

[57] ABSTRACT

An electric motor of outer-rotor type includes: an inner stator mounted on a stator holder, an outer rotor rotatably circumferentially disposed around the inner stator, a shaft coaxially secured with the outer rotor, and a housing combined with the stator holder for encasing the outer rotor and the inner stator within the housing; with the inner stator including an annular core made of magnetic conductor, a plurality of fin arrays made of magnetic conductors and formed as a fin array assembly concentrically wrapped on the annular core, and a plurality of insulating coil bobbins each coil bobbin pre-wound with the coil windings thereon and jacketed on each fin array, thereby forming an inner stator having a stable construction, a higher winding capacity, higher magnetic flux density and higher output power, as well as a lower production cost.

11 Claims, 8 Drawing Sheets

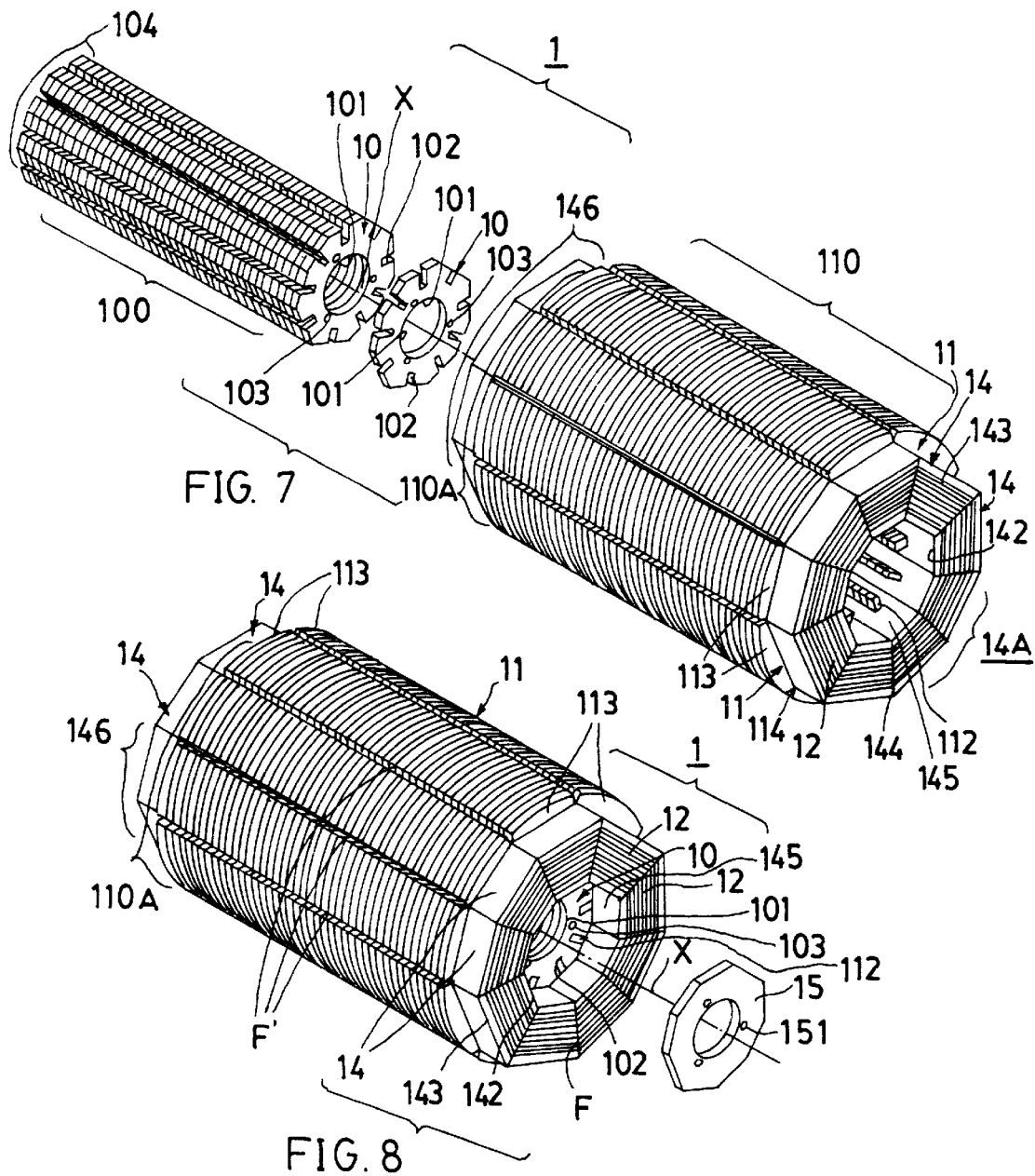

6,081,059

OUTER-ROTOR ELECTRIC MOTOR HAVING INNER-STATOR FORMED BY CONCENTRICALLY WRAPPING FLATTENED STATOR ELEMENTS ON STATOR CORE

BACKGROUND OF THE INVENTION

A conventional electric motor, such as disclosed in a Japanese invention patent application publication (Laid-open) No. 6-351185 (copy enclosed) as illustrated in FIG. 15 of this application, includes: an inner stator S secured on a base B, a plurality of tooth member sets T radially secured to an annular yoke Y having coil windings W wound on each tooth member set T and limited between two stopping fasteners Fr clamped on the tooth member set T, and an outer rotor R having magnets M secured thereon rotatably circumferentially disposed around the inner stator S having a shaft A coaxially secured to the outer rotor R.

However, such a conventional outer-rotor type electric motor has the following drawbacks:
1. Each tooth member set T includes plural tooth members clamped by an inner and an outer stopping fastener Fr for limiting the coil windings W as wound on the tooth members, thereby reducing the winding area and decreasing the coil windings on the stator and decreasing the torque output from such an electric motor.
2. Each tooth member has only an inner lug T1 insertably fixed in the annular yoke Y, leaving the outer portion of the tooth member unstably suspending (without being supported) in the air to thereby easily cause vibrational shock or influence the magnetic fields between the stator and the rotor.
3. Due to the unstable structure and assembly complexity when making the inner stator of such a conventional motor, it is merely suitable for making a "thin" or "flat" miniature motor, unable for producing a motor of higher torque output.

The present inventor has found the drawbacks of the conventional electric motor and invented the present motor having higher torque output and efficiency.

SUMMARY OF THE INVENTION

The object of the present invention is to provide an electric motor of outer-rotor type including: an inner stator mounted on a stator holder, an outer rotor rotatably circumferentially disposed around the inner stator, a shaft coaxially secured with the outer rotor, and a housing combined with the stator holder for encasing the outer rotor and the inner stator within the housing; with the inner stator including an annular core made of magnetic conductor, a plurality of fin arrays made of magnetic conductors and formed as a fin array assembly concentrically wrapped on the annular core, and a plurality of insulating coil bobbins each coil bobbin pre-wound with the coil windings thereon and jacketed on each fin array, thereby forming an inner stator having a stable construction, a higher winding capacity, higher magnetic flux density and higher output power, as well as a lower production cost.

BRIEF DESCRIPTION OF THE DRAWINGS

FIG. 7 is a perspective view of the inner stator as exploded.

FIG. 8 is an illustration of the inner stator as assembled.

DETAILED DESCRIPTION

Figure 1:
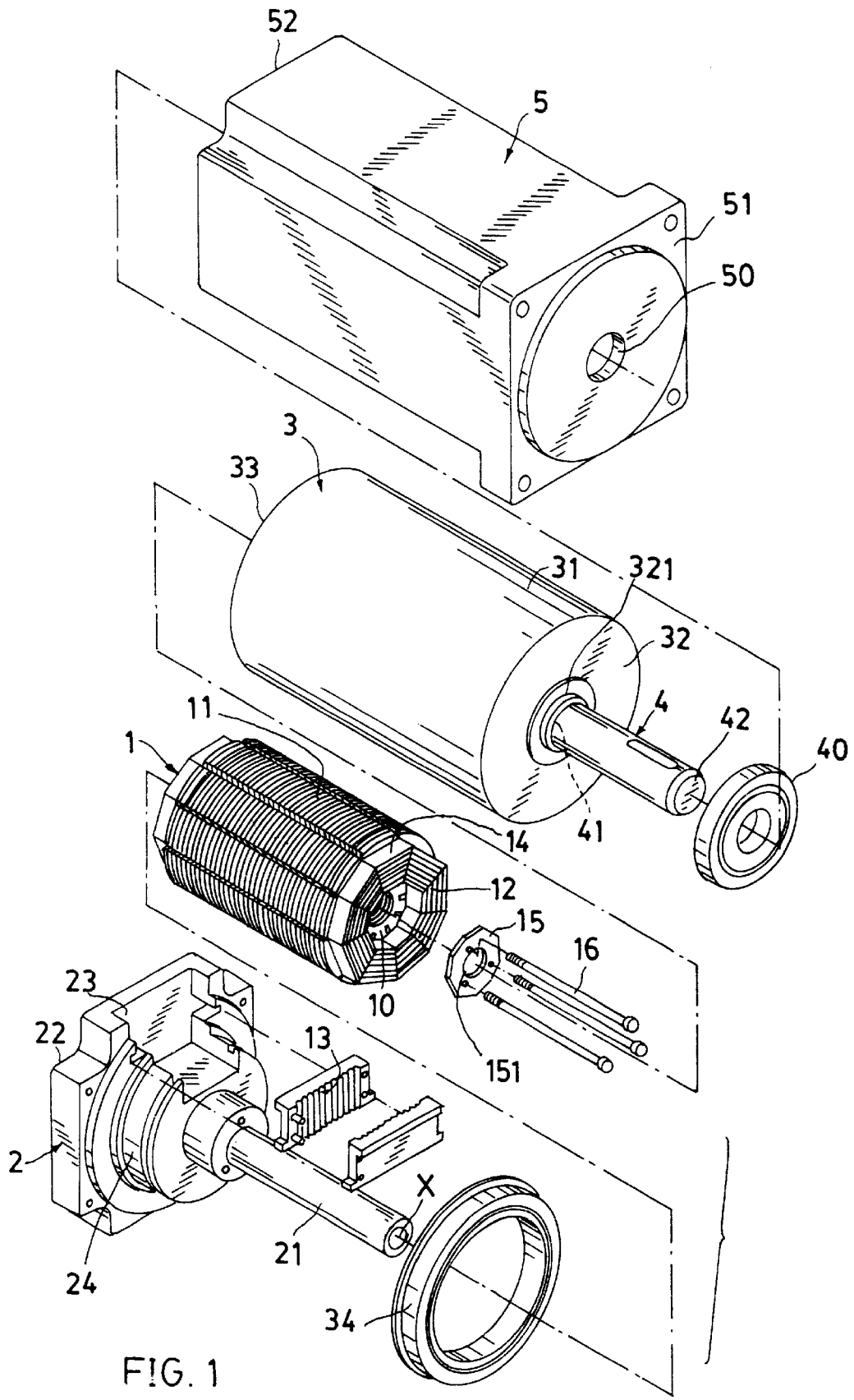
FIG. 1 is an exploded view showing the elements of the present invention.

As shown in FIGS. 1~12, the present invention comprises: an inner stator 1, a stator holder 2 for mounting the inner stator 1 thereon, an outer rotor 3 rotatably circumferentially disposed around the inner stator 1, a shaft 4 coaxially secured with the outer rotor 3 about a longitudinal axis X defined at a longitudinal center of the stator holder 2, and a housing 5 combined with the stator holder 2 for encasing the outer rotor 3 and the inner stator 1 within the housing 5 and the holder 2. The housing 5 may also be eliminated in this invention.

The stator holder 2 includes: a central stem 21 protruding longitudinally from a base 22 of the holder 2, with the base 22 combinable with the housing 5 for encasing the stator 1 and the rotor 3 within the housing 5 and the holder 2.

The inner stator 11 includes: an annular core 100 secured on the central stem 21 of the stator holder 2, a fin array assembly 110A radially mounted on and concentrically disposed around the core 100, an insulating coil bobbin assembly 14A embedded with the fin array assembly 110A and provided for winding a plurality of magnetizing coil windings 12 on each insulating coil bobbin 14 of the bobbin assembly 14A having electric wires 13 electrically connected between the coil windings 12 and an external power supply source (not shown), and a retaining disk 15 for fixing the core 100 on the stem 21 of the stator holder 2 by bolts 16.

Figure 10:
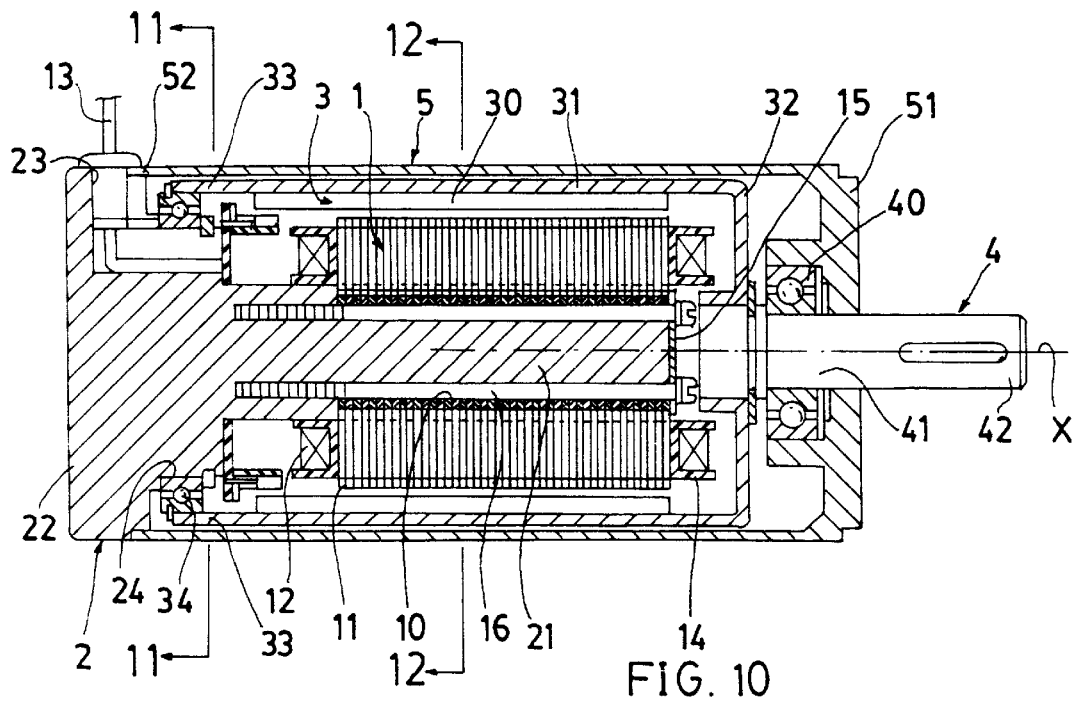
FIG. 10 is a longitudinal sectional drawing of the present invention.
Figure 11:
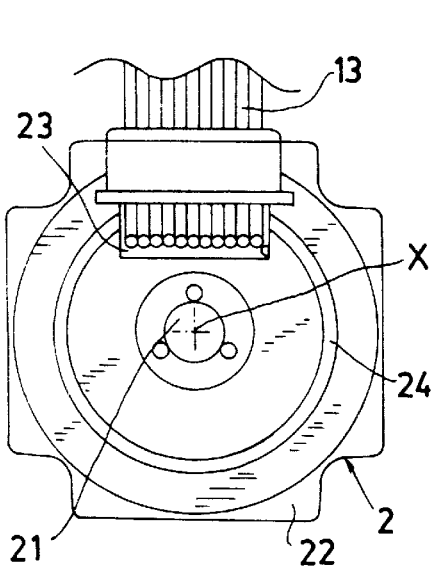
FIG. 11 is a cross sectional drawing of the present invention as viewed from 11—11 direction of FIG. 10.
Figure 12:
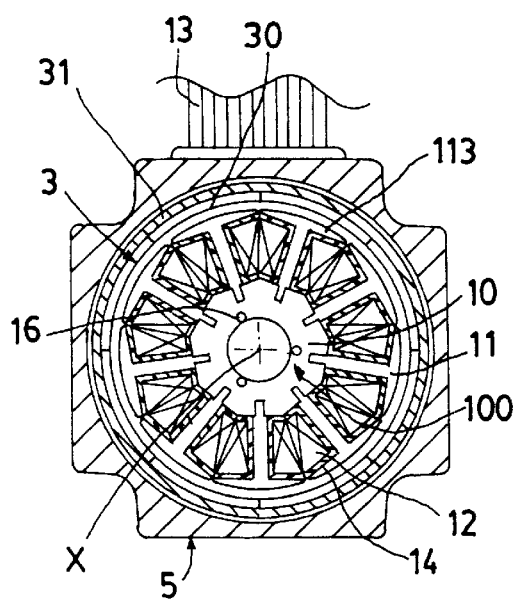
FIG. 12 is a cross sectional drawing of the present invention as viewed from 12—12 direction of FIG. 10.

The annular core 100 is formed by laminating a plurality of central collar members 10 along a longitudinal axis X defined at a longitudinal center of the central stem 21 of the stator holder 2; each central collar member 10 made of magnetic conductor and each including: a central hole 101 formed in a central portion of the collar member and engageable with the central stem 21 of the stator holder 2, a plurality of recesses 102 circumferentially recessed and equally spaced in a periphery of the collar member each recess 102 being formed as a "1" shape, an inversed T (not shown) shape or any other suitable shapes, and a plurality of bolt holes 103 formed in the collar member 10 adapted for passing each bolt 16 through each bolt hole 103 for coaxially fixing the core 100 on the stem 21 of the stator holder 2 as shown in FIGS. 10 and 8; with all the recesses 102 longitudinally or linearly aligned when all the core members 10 are laminated to form the core 100 as shown in FIGS. 7 and 8. Besides, other joining methods, rather than the lamination, may be used for forming the core 100 including at least a core member 10.

The fin array assembly 110A includes a plurality of fin arrays 110 juxtapositionally linked together to be a linear chain-like arrangement having a cross section defining a flattening line L2 (FIG. 2) projectively perpendicular to the longitudinal axis X of the stem 21 of the stator holder 2, with each fin array 110 generally parallel to the longitudinal axis X of the stator holder 2.

Each fin array 110 is formed by laminating a plurality of radial fin members 11 juxtapositional or parallel to the longitudinal axis X of the stem 21 of the stator holder 2; each radial fin member 11 made of magnetic conductor, formed as an arcuate T shape and each including: a shank portion 111, an engaging root portion 112, which may be formed as a "1" shape, an inversed T shape, a ratchet tooth shape or any other suitable shapes, formed on a bottom end of the shank portion 111 and engageable with each recess 102 (formed as "1" or inversed T shape, ratchet tooth shape or other shapes) in each collar member 10 for radially mounting the fin array 110 on the annular core 100 of the inner stator 1, and a rod portion 113 perpendicularly formed on a top end of the shank portion 111 to form the T-shaped fin member 11; with all radial fin members 11 superimposed longitudinally to form the fin array 110 (FIG. 2) to be juxtapositional to the longitudinal axis X defined at the longitudinal center of the core 100 and of the stem 21 of the holder 2. Every two neighboring fin members 11 of the corresponding two fin arrays 110 are linked by a hinge portion 114 having thin thickness between two rod portions 113 of the two fin members 11 (FIG. 5) to form a folding line F' between the two fin members 11, with each folding line F' parallel to the longitudinal axis X of the holder 2; whereby upon a concentric curving of the fin array assembly 110A about the axis X, the fin array assembly 110A will be concentrically wrapped on the core 100 as packed by the coil bobbins 14 of bobbin array 14A.

The insulating coil bobbin assembly 14A includes a plurality of insulating coil bobbins 14 juxtapositionally linked together to be a linear chain-like arrangement having a cross section defining a flattening line L1 (FIG. 2) projectively perpendicular to the longitudinal axis X of the stator holder 2, with each coil bobbin 14 generally parallel to the longitudinal axis X of the holder 2. Each insulating coil bobbin 14 is made of electrically insulative material having its cross section generally formed as an I shape, including: a central slot 140 longitudinally formed in an elongate reel portion 141 and engageable with the shank portion 111 of each radial fin member 11 of the fin array 110 when inserting each root portion 112 of each fin member 11 through the central slot 140 to be protruded downwardly beyond the central slot 140, a centripetal flange 142 perpendicularly formed on a bottom portion of the reel portion 141 and engageably ridable on a periphery of the core 100, and a peripheral flange 143 perpendicularly formed on a top portion of the reel portion 141 for retaining the rod portion 113 of each radial fin member 11 when engaged with each coil bobbin 14; whereby upon insertion of the shank portions 111 of the fin members 11 of the fin array 110 into the central slots 140 of the insulating coil bobbins 14 to protrude the root portions 112 of the fin members 11 of the fin array 110 beyond the centripetal flanges 142 of the bobbins 14, and upon engagement of the root portions 112 of the fin array 110 with the recesses 102 as recessed in the collar members 10 of the core 100; the fin array 110 will be radially mounted on the periphery of the core 100 having the insulating coil bobbins 14 packed and retained between the rod portions 113 of the fin array 110 and the periphery of the core 100.

Figure 4:
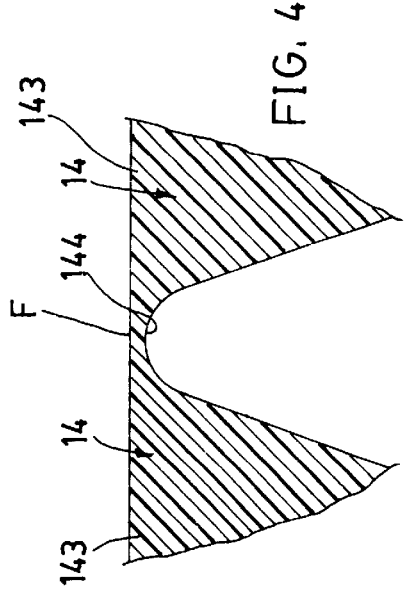
FIG. 4 is a sectional drawing of the hinge portion of the two linked bobbins.

Every two neighboring coil bobbins 14 are linked by a hinge portion 144 as shown in FIG. 4 having thin thickness between two peripheral flanges 143 of the two coil bobbins 14 to form a folding line F between the two coil bobbins 14, with each folding line F parallel to the longitudinal axis X of the holder 2. Upon concentric curving of the bobbin assembly 14A, the bobbins 14 will be concentrically wrapped on the core 100.

Figure 6:
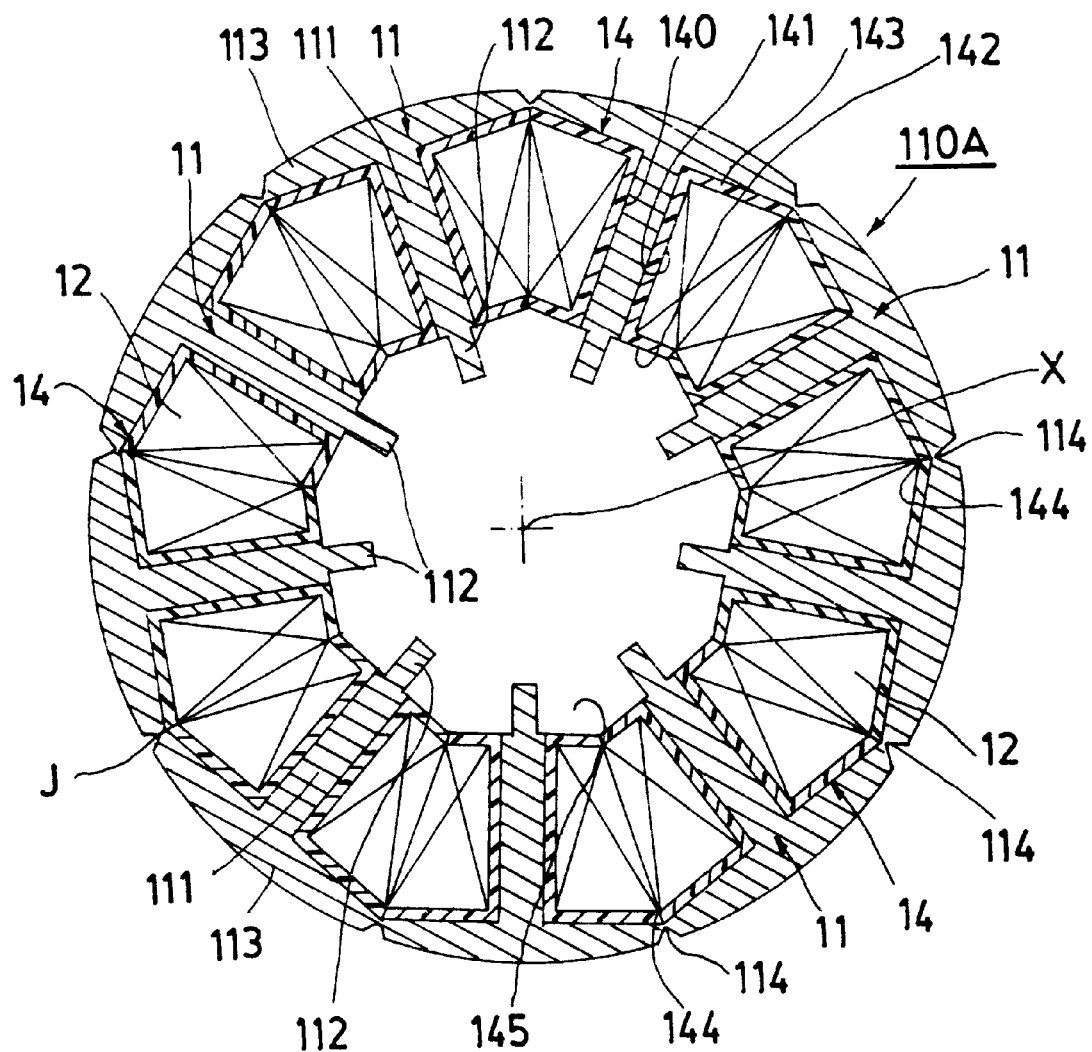
FIG. 6 is a cross sectional drawing of the fin array assembly and coil bobbin assembly when annularly assembled.
Figure 9:
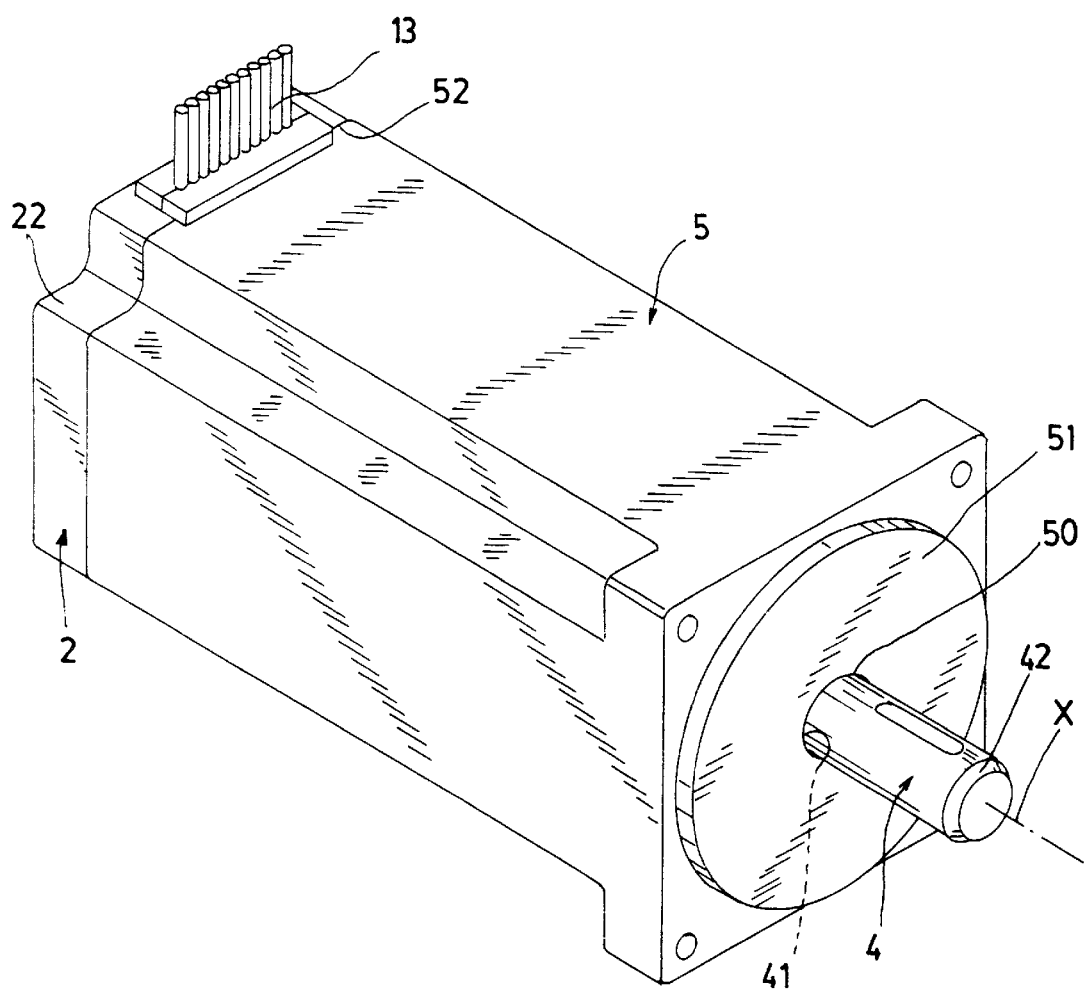
FIG. 9 is a perspective view of the electric motor of this invention.

The coil bobbins 14 may be pre-wound with the magnetizing coil windings 12 on the bobbins 14. Then, the fin arrays 110 of the fin array assembly 110A are embedded into the slots 140 in the bobbins 14 of the bobbin assembly 14A to allow each fin array 110 to be engaged with each coil bobbin 14; whereby upon a concentric curving of the fin array 110A and the bobbin assembly 14A, an annular configuration by combining the fin array 110A with the bobbin assembly 14A is formed as shown in FIG. 6; having an inner ring 145 formed by concentrically connecting the centripetal flanges 142 of the bobbins 14, and an outer ring 146 formed by concentrically curving the peripheral flanges 143 of the bobbins 14.

Each root portion 112 of each fin member 11 is engageably inserted into each recess 102 recessed in each collar member 10 of the core 100. Upon engaging of the annular combination of the fin array assembly 110A and bobbin assembly 14A with the core 100 (FIGS. 7, 8, 10) by engaging the root portions 112 with the recesses 102 and by engaging the inner ring 145 of the bobbin assembly 14A with a collar periphery 104 of the core 100, the inner stator 1 will be assembled. With the inner and outer rings 145, 146 formed by radially assembling the bobbins around the core 100 for concentrically "building" a cylindrical member like a "packing" strongly and stably cushioned between the core 100 and the fin arrays 110 in order for forming the inner stator 1 with stable and strong construction.

Figure 2:
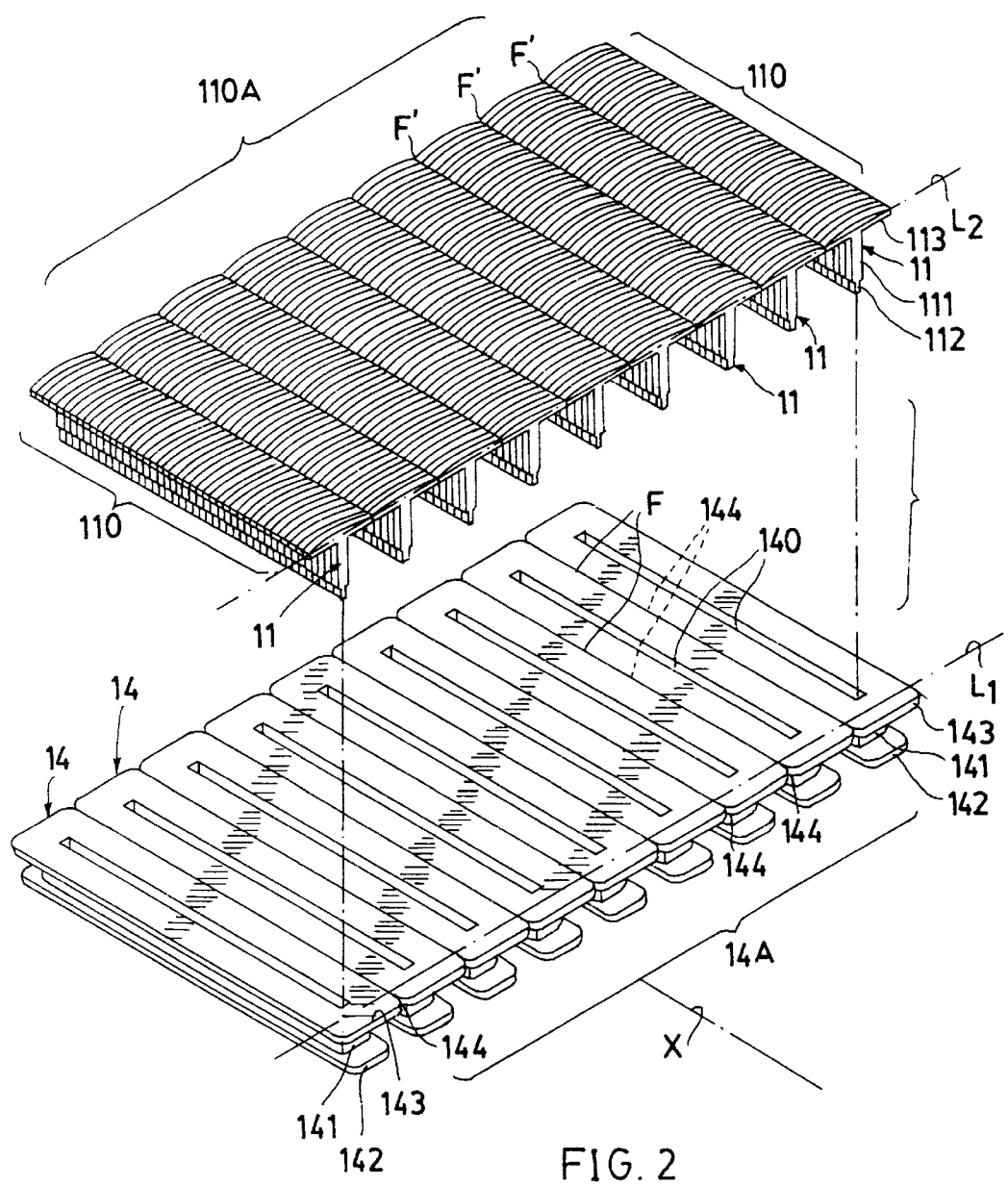
FIG. 2 is an illustration showing flattened fin array assembly and coil bobbin assembly of the present invention.
Figure 3:
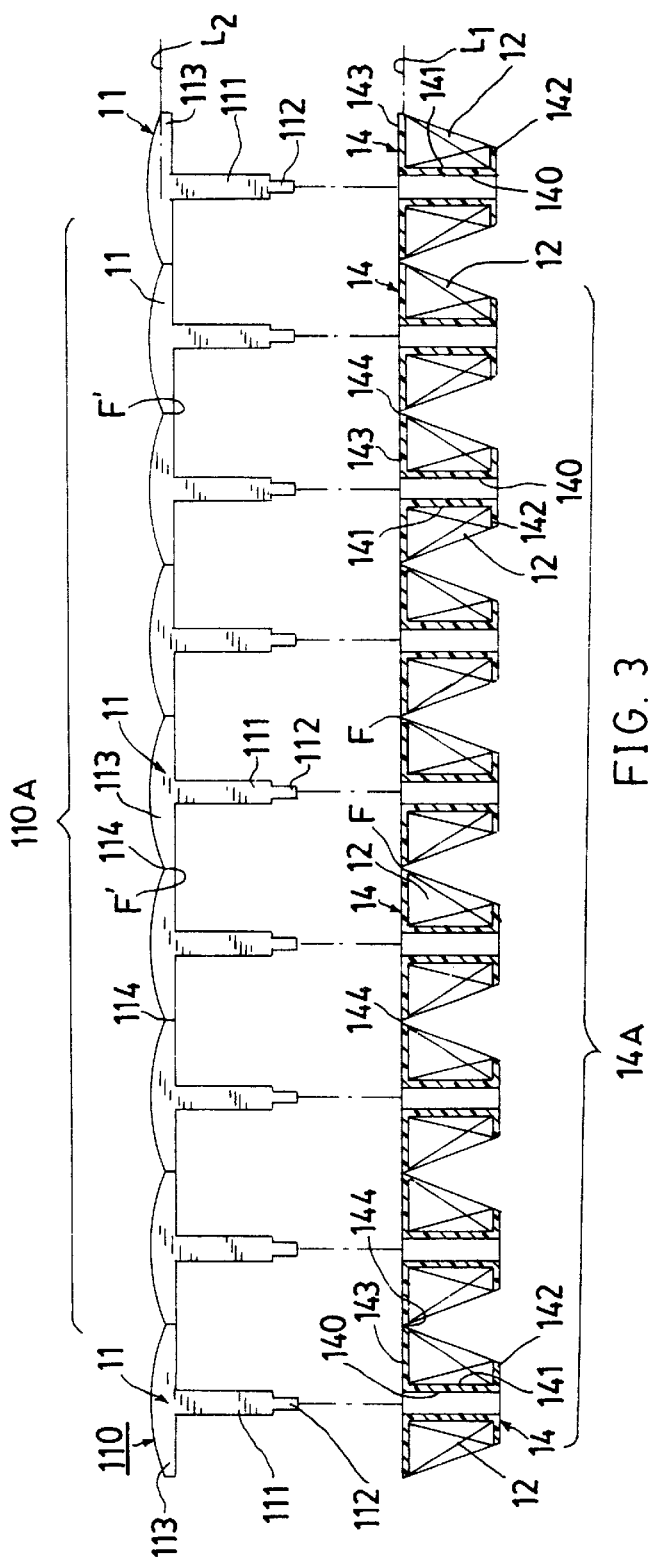
FIG. 3 is a front view from FIG. 2.
Figure 5:
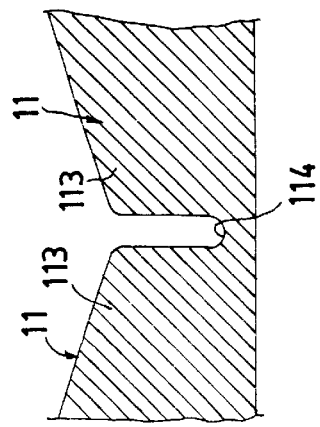
FIG. 5 is a sectional drawing of the hinge portion of the two linked fin members.

The bobbin assembly 14A may not be linked as that shown in FIG. 2, and the bobbins 14 are then individually engageable with the fin array 110 respectively. The coil windings 12 may be prewound on the bobbins 14 before engaged with the fin members 11; or the coil windings 12 may be wound on the bobbins after being engaged with the fin members 11.

By capping the retaining disk 15 on an end portion of the core 100 and by passing the bolts 16 through the bolt holes 151 formed in the disk 15 and through the bolt holes 103 formed through the core 100, the stator 1 will be firmly stably secured on the stem 21 of the stator holder 2 (FIG. 10). The core 100 may have a polygonal periphery 104 to engage the bobbin assembly 14A formed as polygonal shape. Naturally, they may be formed as cylindrical shape or other shapes.

Figure 13:
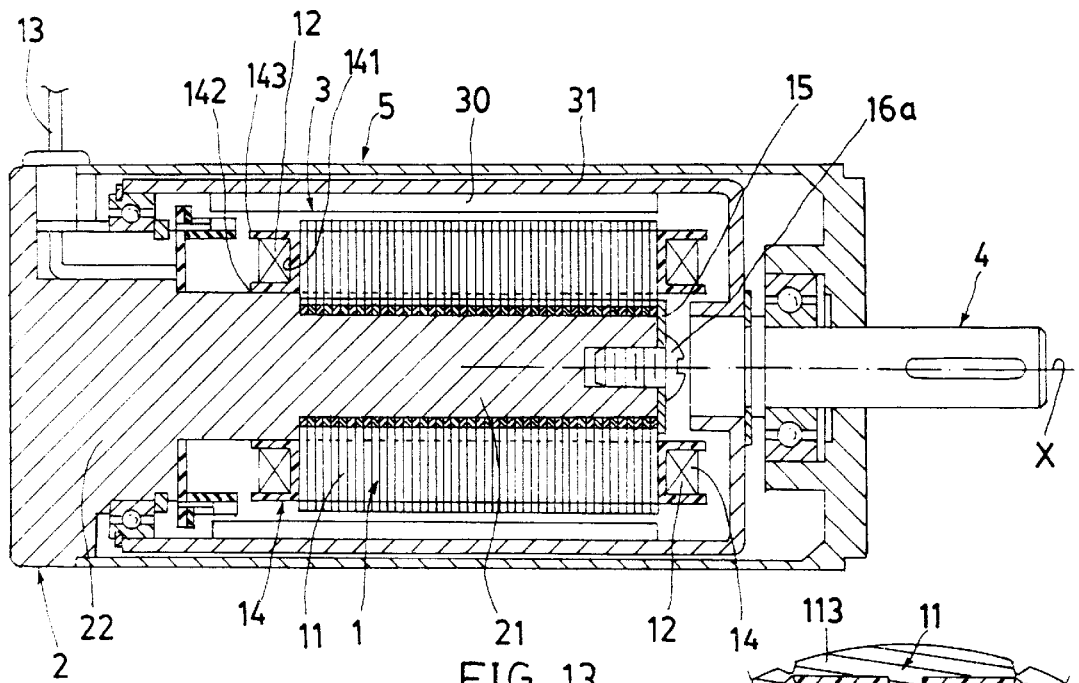
FIG. 13 is a longitudinal sectional drawing of another preferred embodiment of the present invention.

The bolts 16 may be modified to be an axial (or unique) bolt 16a fixing the disk 15 and the core 100 on the stem 21 of the holder 2 as shown in FIG. 13.

The magnetic conductors of the collar members 10 and the radial fin members 11 may be made of laminated silicon steel sheets or ferromagnetic plates. The core 100 or the fin array 110 may also be formed by injection molding of magnetically conductive powder materials blended with resin materials. All the magnetic materials should have better permeability.

The outer rotor 3 includes: a cylinder member 31 circumferentially disposed around the inner stator 1 and a cylindrical magnetic conductor 30 secured to an inside wall of the cylinder member 31.

The cylindrical magnetic conductor 30 may be made of permanent magnet, hysteresis ferromagnetic material, or any other materials which are magnetically conductive and may interact with the inner stator 1 to cause rotation of the outer stator 3 due to armature reaction between the inner stator 1 and the outer rotor 3.

The cylinder member 31 of the outer rotor 3 includes: a closed-end plate 32 formed on a first end of the cylinder member 31 having a central hub portion 321 coaxially secured with the shaft 4 about the longitudinal axis X of the central stem 21 of the stator holder 2, an open-end periphery 33 formed on a second end of the cylinder member 31 opposite to the closed-end plate 32 and rotatably engageable with the base 22 of the stator holder 2 by means of a bearing 34 annularly formed between the open-end periphery 33 of the cylinder member 31 and the base 22.

The base 22 of the stator holder 2 is annularly formed with a bearing groove or retaining portion 24 for fixing the bearing 34 therein for rotatably engaging and supporting the open-end periphery 33 of the cylinder member 31 of the outer rotor 3 for increasing the rotation stability of the rotor 3 in the present invention and for preventing or minimizing vibrational shock caused during the rotation.

The shaft 4 is rotatably mounted through a shaft hole 50 formed in a central portion of a closed-end plate 51 of the housing by a shaft bearing 40, having an inner end portion 41 of the shaft 4 coaxially secured with the central hub portion 321 of the cylinder member 31 of the outer rotor 3 about the longitudinal axis X, and an outer end portion 42 connected to any operational machine (not shown) driven by the motor of the present invention.

The housing 5 has an open-end periphery 52 formed on a free end of the housing 5 opposite to the close-end plate 51 to be combined with the base 22 of the stator holder 2 for encasing the inner stator 1 and the outer rotor 3 within the housing 5.

The stator holder 2 is formed with a wire passage 23 adjacent the base 22 for inserting the electric wires 13, electrically connected between the coil windings 12 and an external power supply source, into the wire passage 23.

The coil windings 12 are pre-wound on the reel portions 141 of the bobbin 14, neither on the fin extension 110 nor on the core 100, for a quicker assembly and production of the inner stator 1 of the present invention. Also, the bobbin 14 is made of electrically insulative materials durable for high voltage electric current led into the coil windings 12 of the present invention.

The present invention is superior to a conventional outer-rotor type motor with the following advantages:

1. All the bobbins 14 can be flattened ("L1" of FIG. 2) to be a linear chain-like arrangement for prewinding the magnetizing coil windings 12 on the bobbins 14, other than winding on the T-shaped fin arrays 110, thereby increasing the winding capacity and density of the inner stator for increasing a magnetic flux density of the magnetizing coil windings and increasing the output torque and efficiency of the motor.
2. The bobbins are linearly flattened for an easy, faster, convenient and ergonomic winding operation for winding the coils 12 on the bobbins 14.
3. The fin arrays 110 are stably secured on the core 100 as packed by the bobbins 14, and the core 100 is in turn stably fixed on the stator holder 2, thereby forming a stably constructed inner stator and thereby preventing the vibrational shock and minimizing the variations of magnetic field for smoothly enhancing the armature reaction between the stator and the rotor.
4. The coil windings are pre-wound on the insulating bobbins so that a higher voltage can be durably sustained between the windings and the T-shaped magnetic conductors (fin arrays) 110, ensuring a durability of high tension of the motor.
5. Each bobbin may be pre-wound with the coil windings thereon and then inserted therethrough each T-shaped magnetic conductor (fin array). Then, the fin arrays and the bobbins are radially secured to the core 100 for a rapid assembly, easier installation and a lower production cost.

The present invention may be further modified without departing from the spirit and scope of the present invention. The "fin member" (11) as defined in this invention may also be designated as a "stator tooth" or the like.

Figure 14:
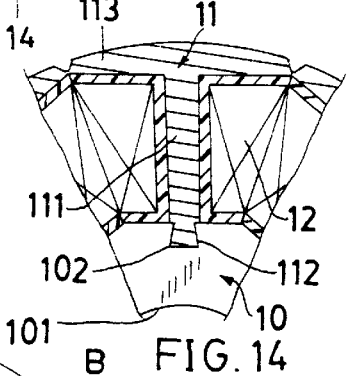
FIG. 14 shows another embodiment of the core and the fin member of this invention.
Figure 15:
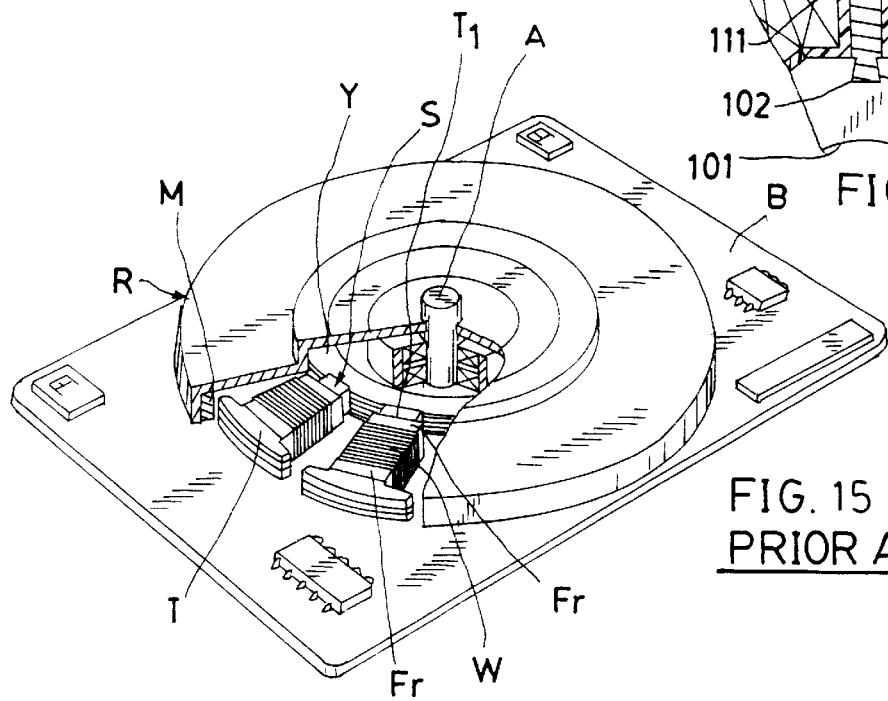
FIG. 15 shows a conventional electric motor with outer rotor.

As show in FIG. 14, the root portion 112 of the fin member 11 may also be formed as a dovetail shape to be engaged with a dovetail-shaped recess 102 as recessed in the collar member 10. So, the recess 102 of the collar member has an inner width adjacent to the axis X wider than an outer width adjacent the core periphery for forming an embedding portion for engaging the root portion 112 of the fin member 11.

I claim:

1. An electric motor with outer rotor comprising:

an inner stator secured on a central stem of a stator holder having a longitudinal axis defined at a longitudinal center of the central stem of the stator holder;

an outer rotor circumferentially disposed around said inner stator and having a cylindrical magnetic conductor formed on an inside wall of said outer rotor operatively interacting with said inner stator when magnetized to cause rotation of said outer rotor due to armature reaction between said inner stator and said outer rotor;

a shaft coaxially secured with said outer rotor about said longitudinal axis;

said inner stator including:

an annular core including at least a central collar member and made of magnetic conductor secured on said central stem of said stator holder, having a plurality of recesses equally spaced and recessed in a core periphery of said collar member;

a fin array assembly including a plurality of fin arrays juxtapositionally linked to be a linear chain-like arrangement when flattened, each said fin array being a magnetic conductor and generally parallel to said longitudinal axis, said fin array assembly, having every two said fin arrays linked by a hinge portion therebetween having a folding line formed between said two fin arrays allowing a concentric curving of said fin arrays of said fin array assembly about said core, each fin array including at least a radial fin member having a cross section of T shape having a shank portion, and an engaging root portion formed on a bottom end of the shank portion to be engaged with each said recess in said collar member;

an insulating coil bobbin assembly embedded with said fin array assembly therein and including a plurality of insulating coil bobbins juxtapositionally linked to be a linear chain-like arrangement when flattened, each said coil bobbin made of electrically insulative material and being generally parallel to said longitudinal axis of said stator holder, each said bobbin including a reel portion formed with a central slot therein for inserting said shank portion of each said fin member through said central slot in said reel portion for winding magnetizing coil windings on said reel portion of each said bobbin, having a bobbin hinge portion formed between two said coil bobbins to define a bobbin folding line longitudinally in the bobbin hinge portion allowing a concentric curving of said coil bobbins to be concentrically wrapped on said core; said coil bobbin assembly flattened for prewinding magnetizing coil windings, electrically connected to a power source, on said coil bobbins;

whereby upon embedding of said fin array assembly in said coil bobbin assembly prewound with said coil windings thereon and upon concentric curving of said fin array assembly and said coil bobbin assembly about said core to be concentrically wrapped on said core, said fin arrays are radially mounted on said core; and a retaining disk capping an outer end portion of said core for stably fixing said core and said bobbins of said inner stator on said stator holder by a at least a bolt.

2. An electric motor according to claim 1, wherein said core is secured on said central stem of said stator holder by said retaining disk retained on an outer end portion of said core, having an axial bolt fixing said retaining disk on said central stem of said stator holder for retaining said core on said central stem.

3. An electric motor according to claim 1, wherein said core is secured to said central stem of said stator holder by passing at least a bolt through said retaining disk capped and retained on an end portion of said core and by passing said bolt through at least a bolt hole formed in said core for stably fixing said core on said stator holder.

4. An electric motor according to claim 1, wherein said collar member includes each said recess having an inner width adjacent to the axis wider than an outer width adjacent to said core periphery of the collar member for forming an embedding portion for engaging said root portion of each said fin member.

5. An electric motor according to claim 1, wherein said core and said fin array is each made of ferromagnetic materials including silicon steel plates which are laminated.

6. An electric motor according to claim 1, wherein said core and said fin array are each made by injection molding of magnetically conductive powder materials as blended with resin materials.

7. An electric motor according to claim 1, wherein said coil bobbins are linearly flattened for prewinding said coil windings thereon, and then said coil bobbins are embedded with said fin arrays in said bobbins.

8. An electric motor according to claim 1, wherein said coil bobbins are embedded with said fin arrays therein, and then said coil bobbins are prewound with coil windings thereon.

9. An electric motor according to claim 1, wherein each said coil bobbin is independently prewound with coil windings thereon.

10. An electric motor according to claim 1, wherein said coil bobbin assembly is broken down to be a plurality of individual coil bobbins, each said coil bobbin embedded with each said fin array therein.

11. An electric motor according to claim 1, wherein said core includes a polygonal core periphery to be engaged with the coil bobbin assembly formed as polygonal shape when concentrically wrapped on said core.

* * * * *